May 30, 1933. B. JUHÁSZ 1,911,900
ARRANGEMENT FOR THE TRANSMISSION OF PICTURES BY ELECTRICAL MEANS
Filed March 25, 1931
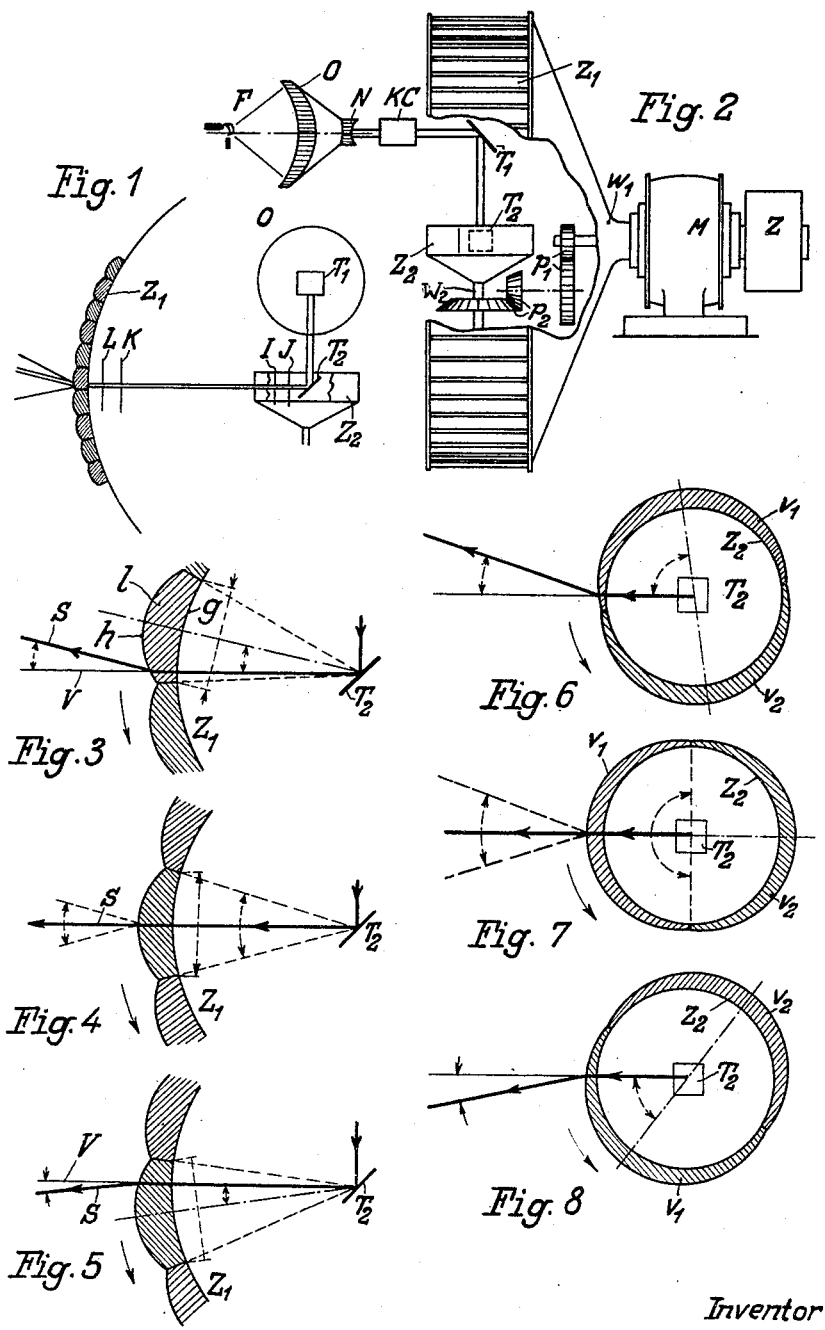
Inventor:
B. Juhasz
By: *[signature]*
Attys.

Patented May 30, 1933

1,911,900

UNITED STATES PATENT OFFICE

BÉLA JUHÁSZ, OF BUDAPEST, HUNGARY

ARRANGEMENT FOR THE TRANSMISSION OF PICTURES BY ELECTRICAL MEANS

Application filed March 25, 1931, Serial No. 525,215, and in Germany March 31, 1930.

This invention relates to an arrangement for the transmission of pictures by electrical means, particularly for the wireless transmission of stationary or moving pictures. More especially, the invention relates to an arrangement for the reception of the picture transmitted, i. e. for the composition of the picture from the picture elements transmitted. This is done by subdividing in a manner known the picture to be transmitted into point-like elements which in the electric transmission circuit create oscillations of current proportional of their light intensities. These oscillations are superposed on the wave of a wireless sending device. The waves transmitted exert an influence, varying according to their respective amplitudes, on the intensity of a source of light, by which the picture, consisting of point-like elements likewise, is produced on the screen of the projecting device. The subdivision of the picture as well as the assembling of the picture is generally effected by means of rotating perforated diaphragms. One perforation of the diaphragm being very small in proportion to the whole bundle of light rays, the ratio being usually of the order of magnitude of $$\frac{1}{50,000},$$

the picture element drawn by the receiving set is of very low light intensity. This disadvantage is removed by the invention. The bundle of light rays of the electric source of light, the current of which is influenced by the waves transmitted by the sending device, is guided as a narrow bundle of rays so as to make it cover, during its motion, the whole picture area in consecutive strips. The lighting power of the source of light being thus always concentrated in a single point, a picture of great intensity of illumination is obtained which is also suitable for large-scale projection. A bundle of light rays of narrow width but of very great intensity of illumination is created in the receiving device according to the invention, the said intensity of illumination being modulated according to the amplitude of the waves received, and the bundle of light rays is governed in such a manner as to ensure that its point of incidence on the screen will perform the same motion which is performed by the sensing point on the picture to be transmitted.

A form of design of the receiving device is shown on the drawing, on which

Fig. 1 is a plan view of a part of the receiving device.

Fig. 2 is a side view of the receiving device with the lenses partly removed.

Figs. 3 to 5 illustrate the movement of the light ray in the vertical direction.

Figs. 6 to 8 illustrate the movement of the light ray in the horizontal direction.

The movement of the bundle of light rays in the receiving device is composed of a rapid vertical and of a slow horizontal component. In a cylinder rotating at a high speed cylindrical lenses $l$ are arranged in the place of the well-known holes, one lens being provided in the place of each group of holes, the total number of lenses in the example assumed being 60. The movement in the vertical direction of the light ray is effected by means of the cylinder lenses $l$ of the cylinder $Z_1$, shown in part, in various positions, in the Figs. 9 to 11. The lenses $l$ are ground in such a manner as to ensure that the radius of curvature of the inner surface $g$ is equal to the distance from the rotation shaft in the mirror $T_2$ so that the light always falls on the lens in the perpendicular direction. The outside surface $h$ is ground to a convex form, so that the ray of light $s$ is during the rotation of the lens system, always being deflected in the direction of V. This movement of the light ray is shown in the Figures 9 to 11. The ray first strikes against the lens on the bottom edge (Fig. 3) and is deflected upward, and therefore strikes against the screen at the top edge of the latter. During the subsequent rotation of the lens system in the direction of the arrow the ray gradually travels downward, this travel being, if the lenses are dimensioned correspondingly, continued down to the bottom edge of the screen. (Figs. 4 and 5.) The width of the lenses corresponds to the width of a row of holes in the sending apparatus, the velocity of the lens system corresponds to the velocity of the hole system in the sending apparatus, so that the movement in the vertical direction of the beam of light $s$ corresponds to the movement of the sensing point P' in Fig. 1. The lenses $l$ are on the convex side ground in such a manner as to make the point of incidence of the light ray on the screen travel at uniform speed. As however the inside of lens $l$ is a cylindrical surface, it is easy on the basis of known mathematical relations, to calculate the proper external shape of the lens.

The movement in the horizontal direction of the bundle of light rays is likewise effected by means of a system of cylindrical lenses $Z_2$ as shown on Figures 6 to 8. This system however turns round a shaft $W_2$ (Fig. 1) which is situated at right angles to the shaft $W_1$ of the first system of cylindrical lenses $Z_1$. This lens system $Z_2$ consists of two lenses $v_1$ and $v_2$, only, each of which possesses an opening of 180° and is likewise ground in such a manner as to ensure that the light point on the screen travels in the horizontal direction and at a uniform speed. Both lens systems are driven by the motor M, the lens system $Z_2$ being driven by means of tooth-wheel gears $p_1$, $p_2$. Accordingly the movement of the light ray in the receiving device is not strictly vertical, but slightly inclined towards the horizontal. This inclination is, however, so slight, (in the example chosen 0.25:45 i. e. 1:180) that it does not distort the picture. The light comes from the source of light F, is projected through the condenser O on the lens N, following which it passes, as a parallel bundle of light rays, through cell $Kc$ and is reflected by mirror $T_1$ into the mirror $T_2$. From here it passes through the diaphragms I and J, fitted with vertical gaps, and through the diaphragms L and K, fitted with horizontal gaps, into the system of cylindrical lenses $Z_1$. The cell $Kc$ is in a manner known connected into the circuit of the receiving device. Z is a synchronizing device, likewise known, ensuring that the receiving device will operate in equal phase and in a synchronous manner. It is hereby ensured that the picture transmitted will be drawn on the screen by the ray of light issuing from the lens system $Z_1$.

As is seen from Figs. 3 to 8 the generators of both the convex and concave surfaces of each cylindrical lens are parallel to the axis of the cylinder. As appears from the above, the sending and receiving device described may be used for the transmission of stationary as well as of moving pictures.

What I claim is:

1. In a picture assembling device for the electric transmission over distances of pictures, the combination of a source of light influenced by the sending apparatus and of two systems of cylindrical lenses, supported in a rotatable manner, each of the said systems consisting of a number of cylindrical lenses arranged inside a cylinder shell, the inside surfaces of the individual lenses, placed with their convex side outward, forming a continuous cylindrical surface.

2. In a picture assembling device for the electrical transmission of pictures over distances, the combination of a light source influenced by the sending apparatus and two systems of cylindrical lenses, the axes of the two lens systems being at right angles and both being parallel to the picture screen, and one lens system being arranged within the other, means for rotating the systems of cylindrical lenses about their axes, and means for projecting the beam from the light source into the interior of one lens system and through the lenses of both systems.

3. In a picture transmitter for electrical transmission of pictures, the combination of a light source which is influenced by the transmitter, two systems of cylindrical lenses in the form of cylindrical members rotatable about their axes, the planes of rotation of the cylinders intersecting, the cylinders being of different sizes and the smaller cylinder being disposed within the larger cylinder so that it is completely surrounded by the wall of the larger cylinder which consists of cylindrical lenses, and means for projecting the beam from the source of light through the lenses of both cylinders.

4. In a picture transmitter for electrical transmission of pictures, the combination of a light source which is influenced by the transmitter, two rotating cylinders, the walls of which consist of cylindrical lenses arranged in rows, the planes of rotation of which intersect and which are of different sizes, the smaller cylinder being disposed within the rotating wall of the larger cylinder, and the generators of the cylindrical lenses in each cylinder being parallel to the axis of the cylinder, means for driving the two cylinders together and gearing between such means of the smaller cylinder so that the cylinders can be rotated with different speeds.

In testimony whereof I have signed my name to this specification.

BÉLA JUHÁSZ.